United States Patent [19]
Brachet

[11] 3,975,943
[45] Aug. 24, 1976

[54] METHOD FOR DETECTING STEAM LEAKAGE IN HEAT-EXCHANGER HAVING CIRCULATION TUBES SURROUNDED BY LIQUID SODIUM AND DEVICES FOR THE APPLICATION OF SAID METHOD

[75] Inventor: Alain Brachet, Orsay, France

[73] Assignee: Electricite de France (Service National), Paris, France

[22] Filed: Aug. 19, 1974

[21] Appl. No.: 498,525

[30] Foreign Application Priority Data
Aug. 28, 1973 France ............................. 73.30531

[52] U.S. Cl. .............................. 73/40; 73/40.5 R;
73/40.7; 165/11
[51] Int. Cl.² ............................................ G01M 3/00
[58] Field of Search ............... 73/40.5, 40.7, 40; 165/11, 71

[56] References Cited
UNITED STATES PATENTS

| | | | |
|---|---|---|---|
| 2,675,493 | 4/1954 | Grobel | 73/40.7 |
| 3,087,327 | 4/1963 | Kagi | 73/40.7 |
| 3,425,264 | 2/1969 | Frei | 73/40.7 |

Primary Examiner—S. Clement Swisher
Attorney, Agent, or Firm—Cameron, Kerkam, Sutton, Stowell & Stowell

[57] ABSTRACT

The present invention concerns an improvement to the method for detecting a steam micro-leak in a heat-exchanger having circulation tubes surrounded by an alkaline/molten/metal (e.g. liquid sodium), said improvement consisting in using the normal operating fluid of the exchanger (in particular, water) as the hydrogenated tracer fluid, in injecting an inert gas successively into groups of tubes comprising at least detecting device (which is based on the measurement of hydrogen, in particular in sodium) until a zero reading, indicative of the leaking tube, is observed.

8 Claims, 7 Drawing Figures

METHOD FOR DETECTING STEAM LEAKAGE IN HEAT-EXCHANGER HAVING CIRCULATION TUBES SURROUNDED BY LIQUID SODIUM AND DEVICES FOR THE APPLICATION OF SAID METHOD

The present invention relates to a method for locating a micro-leak in a steam tube in which a leak has developed, without draining the primary heat exchaning fluid i.e. liquid sodium, and without draining the water and steam (secondary fluid) contained in the other steam tube than the one being undertest.

U.S. Pat. No. 3,721,116 (corresponding French patent No. EN 6941746) discloses a method for locating a steam-tube in which a leak has developed among all the tubes of a heat-exchanger, in which a liquid alkali metal, especially sodium, is used as primary fluid and circulated in contact with the external walls of said tubes in order to transfer heat, whilst the secondary fluid which absorbs said heat and is circulated in said tubes is water in the steam state or in the state of liquid, possibly mixed with steam.

The above method, which is more especially suitable for locating a "micro-leak", (as defined in the parent patent and stated hereinafter), is characterized in that it consists, as an initial step, in detecting the leak, in particulr with a view to assessing its rate of flow so as to know whether it can be classified in the category of micro-leaks, as a second step (or simultaneously), in locating (among all the heat-exchanger tubes and according to a given method), a group of tubes containing the one in which the micro-leak has developed, without any need the modify the operating regime appreciably, with a view to selecting the leaking tube out of said group and of all the heat-exchanger tubes, and finally, as a third step, in plugging said leaking tube, viz. putting it out of service by obturating the end thereof.

According to the above method, the tube, or tubes, wherein a micro-leak has developed are located by, first, succesively introducing an appropriate hydrogenated tracer fluid (e.g. water or steam, or gaseous hydrogen) into the various tubes of the exchanger or of the pre-selected group, then by detecting the presence of hydrogen in the sodium when the fluid introduced into the leaking tube penetrates, in its turn, into the sodium via the leak hole.

The detetion of hydrogen in sodium is preferably carried out by resorting to the phenomenon of hydrogen diffusion through an appropriate metal membrane, or diaphragm (e.g. of nickel), in cooperation with an analyzer, such as a mass-spectrometer for instance.

In a French first parent of addition (No. EN 7126978) to the French patent EN 6941746 (U.S. Pat. No. 3,721,116) are disclosed improvements, in particular a specially devised method which makes it possible (in conjunction with the apparatus for detecting hydrogen), to locate, among all the exchanger tubes, a group of tubes containing the one in which a leak has developed, under the condition stated in the main patent, viz. with no appreciable change in the apparatus operating regime.

The above French first patent of addition EN 7126978 more especially refers to the use where the heat-exchanger tubes reach, with at least one of the two ends thereof, a tubular plate which is in contact with the liquid sodium, one the tube side.

Both in the patent EN 6941746 and in the French first patent of addition EN 7126978, the final locating of the tube wherein a micro-leak has developed, requires draining the water of the steam from all the tubes, on the one hand, and, on the other hand, pressurizing with an inert gaz all said tubes, with the exception of one tube (or a few tubes in the case where a group is resorted to), into which is introduced the hydrogenated tracer fluid; while leading to excellent results in practice, such a method is not devoid of drawbacks. Thus, for instance, the draining of water-tubes and pressurizing of inert gas are rather time-consuming operations, which increase the apparatus shutdown. Moreover, in the course of the draining operation, (even if of short duration), there is a risk that the leak be momentarily stopped, in view of the formation, in the leak orifice, of a plug due to the products (oxide or soda) of the chemical reaction of water with sodium. Therefore, if the previously leaking tube is pressurized with the tracer fluide, the leak, which has thus been stopped by said plug, happens to be momentarily undetectable and, accordingly, cannot be located, at least according to the main patent method or to any other method based on a fluid flow through the leak-orifice.

One object of the present invention is to suppress the above drawbacks, by using the water-steam mixture normally present in the heat-exchanger tubes as the tracer fluid, and successively injecting an inert gas into each tube or group of tubes.

The momentary absence of any hydrogen detection on the sodium side is, in fact, a signal permitting to locate the faulty tube.

The patent EN 6941746 and the French patent of addition EN 7126978 thereto as well as the present application are concerned with the so-called "micro-leaks", which can be defined by the following features:

their rate of flow is sufficient for allowing them to be detected by a sensitive method (e.g. detection of hydrogen in sodium according to the diffusing membrane method), during the normal operation of the installation;

their rate of flow is, however, not high to the extent of deteriorating the adjacent structures through an accelerated corrosion, when such micro-leaks are of some duration, or deteriorating the leak-orifice itself, as would be the case with an important leak which would rapidly enlarge that orifice;

they originate from defects (e.g. cracks or holes) which do not extend to the point of initiating an abrupt rupture of the tube, likely to give rise to an important leak merely under the action of mechanical stresses.

It is known, from practice, that such leaks do occur and are the unavoidable issue of most of the higher grade leaks. Their flow-rate is of about a few milligrams (a few ten-thousandths of an ounce) of water per second, such flow-rate being detectable by the method for detecting hydrogen with a diffusing membrane.

The present invention is an improvement to the method for detecting a steam micro-leak in a heat-exchanger having circulation tubes surrounded by an alkaline/molten/metal (e.g. liquid sodium) such as claimed in the U.S. Pat. No. 3,721,116, said improvement consisting in using the normal operating fluid of the exchanger (in particular, water) as the hydrogenated tracer fluid, in injecting an inert gas successively into groups of tubes comprising at least one circulation tube, and in observing the readings of the leak detecting device (which is based on the measurement of hydrogen, in particular in sodium) until a zero reading, indicative of the leaking tube, is observed.

The inert gas feeding the group of circulation tubes is preferably one of the rare gases or nitrogen.

According to a feature of the invention, the measurement of hydrogen, instead of being carried out in the heat-transferring liquid sodium, is carried out in the gas overlying the sodium, viz. usually argon.

Such an improvement permits the locating operation to proceed, without draining the sodium and, what is more important, without fully draining the water and steam contained in the circulation tubes and in the associated conduits.

According to the present invention the draining of steam is no longer necessary during the locating operation, unless it is stringently requested for some definite reason, e.g. in case the leak evolved dangerously, for instance in view of an increae of the flow rate thereof. Such an evolution can be checked at any moment, since the device for detecting hydrogen controls the leak permanently during the locating operations.

Any unexpected stoppage of the leak during the locating operations will be of little moment as regards the operation of the heat-exchanger: in such case, it will be sufficient to re-start the exchanger, which is simple matter since the exchanger was not drained of its working fluid. However, during the further operation of the exchanger, benefit is derived from the information obtained during the interrupted locating operation; for instance, one knows that the apparatus has a microcrack which may, at any moment, unclog and, therefore, start leaking again. Thus it is possible to watch the apparatus in normal operation with more accuracy, in particular through the detection of hydrogen in the liquid sodium. In addition, if the leak, once the crack is unclogged, is once more detectable, it is sufficient to resume the locating operations at the stage where they were interrupted, which shortens the shutdown accordingly, and increases the chances of bringing the locating operation to an end.

The draining of water and steam, which causes the heat-exchanger to be idle for a long period of time, is not carried out until the locating operation is finished. This idling period is intended to facilitate the plugging of the tubes in which a leak has developed.

In the case of heat-exchanger, the circulation tubes of which separately penetrate into the sodium filled tank, the device according to the present invention is characterized in that each circulation tube comprises a tube for injecting an inert gas, provided with a separate control valve, said injection tube being connected to a supply of pressurized inert gas.

According to a variant, a group of injection tubes is connected to the inert gas supply, and, upstream of all the injection tube separate control valves, is mounted a common valve for controlling the simultaneous introduction of inert gas into all of said injection tubes.

This variant is of special interest and requires but simple alterations in the case of heat-exchangers the circulation tubes of which penetrate seperately into the sodium filled tank (e.g. at the water inlet), viz. those heat-exchangers each circulation tube of which is exposed to the air along a portion of the length thereof, for instance between a water, or steam, input manifold and the sodium filled tank.

In such a case, it is much easier to carry out a possible pre-locating operation of a group of tubes among which is the leaking tube and finally to detect the latter. A group of tubes comprising the leaking tube to be identified is first located, then the latter is located among the group tubes following the same process, i.e. by detecting the very moment when the hydrogen detection in sodium stops revealing the leak, when the inert gas is being injected into each group in turn, or into each of the tubes of the pre-selected group.

In the case of heat exchangers of the type in which the circulation tubes are convected (by the ends thereof corresponding to the admission of water into the apparatus), to a tubular plate in contact with the heat-transferring liquid sodium or with the inert gas (e.g. argon) overlying the sodium, the device according to the present invention is characterized in that, at the above inlet, it comprises circulation tubes, and on the tubular plate water - or steam - side, a tubular counter-plate attached to the above tubular plate. This counter-plate is provided with orifices arranged according to the same pattern as in the above tubular plate, and with grooves, each of which is connected to a supply of pressurized inert gaz through a valved conduit, on the one hand, and to a plurality of circulation tubes by means of openings communicating said circulation tubes with said groove, on the other hand.

According to an embodiment which frequently occurs in practice and which is specially convenient in the present case, the pattern consists of a rectangular mesh of circulation tubes and each groove is connected to a plurality of aligned tubes, through the above-mentioned openings.

A row of circulation tubes is fed with inert gas in this fashion, so that the absence of a leak, when said row is pressurized with inert gas, is an indication that the leaking tube to be identified is one of the tubes of said row fed by the pipes which come from one and the same groove.

According to the present invention, said grooves arc fed with inert gas, either by means of pipes which penetrate into the heat-exchanger through said tubular plate, or by means of pipes penetrating into the exchanger through the tank into an aperture, which is located under the tubular plates, in that part of the exchanger containing the exchanger operating fluid which may be water either in the steam state or in the liquid state.

In order to identify the leaking tube definitively, the method according to the EN 6941746 patent (viz. injecting a hydrogenated fluid separately into each of the tubes of the pre-selected row) shall be resorted to, whenever the heat-exchanger does not contain, on the sodium side, the device according to the French first patent of addition EN 7126978, or if the leak in the tube occurs at some other place than at the connection of said tube with the tubular plate.

On the other hand, if the heat-exchanger is provided with the above device, the method according to the EN 6941746 patent (which requires draining water and steam whenever the leak occurs at the connection of the tube with the tubular plate) may be dispensed with.

In this case, the device according to the present invention is characterized in that sodium flows in compartments, or sockets, defined by the tubular plate, by a plate parallel with said front plate, and by cross-partitions extending at right angles to said two plates and also to the grooves which feed the inert gas. Moreover, said partitions surround but one series of circulation tubes, so that each of said circulation tubes belonging to a given compartment will be fed with inert gas by a separate groove.

The sodium circulating along a given compartment is extracted with a view to determining the amount of dissolved hydrogen, according to the provisions of the present invention.

The use of that device is valid, only in case the leak occurs in that portion of the circulation tube located within a compartment. Such is usually the case, since the weak portions of the circulation tubes are located in the vicinity of the tubular plate welds.

Thus, once the groove corresponding to the leaking tube to be identified has been detected, the second coordinate of said tube is detected by successively extracting sodium form the compartments at right angles to the grooves, until the compartment where the leak is has been found through the detection of hydrogen in sodium (or in the gas overlying the sodium).

The intersection of that comprtment with the groove indicates the leaking tube.

In the case of a heat-exchanger of the type with circulation tubes which separately penetrate into the sodium tank, it is preferable to carry out the injection of inert gas according to the invention, downstream of the membrane (otherwise serving to ensure the hydrodynamic stability of the circulation tube), when such a membrane is provided. It is still better to carry out the injection downstream of an adjustable non-return valve; said non-return valve closes under the inert gas pressure, (thus preventing water from penetrating into the circulation tube), and being or reduced cross-section, acts also in the manner of a membrane with regard to the steam circulation, thus improving the heat-exchanger hydrodynamic stability.

Further features of the present invention will appear from the following description, with reference to the accompanying drawing, in which.

Figure 1:
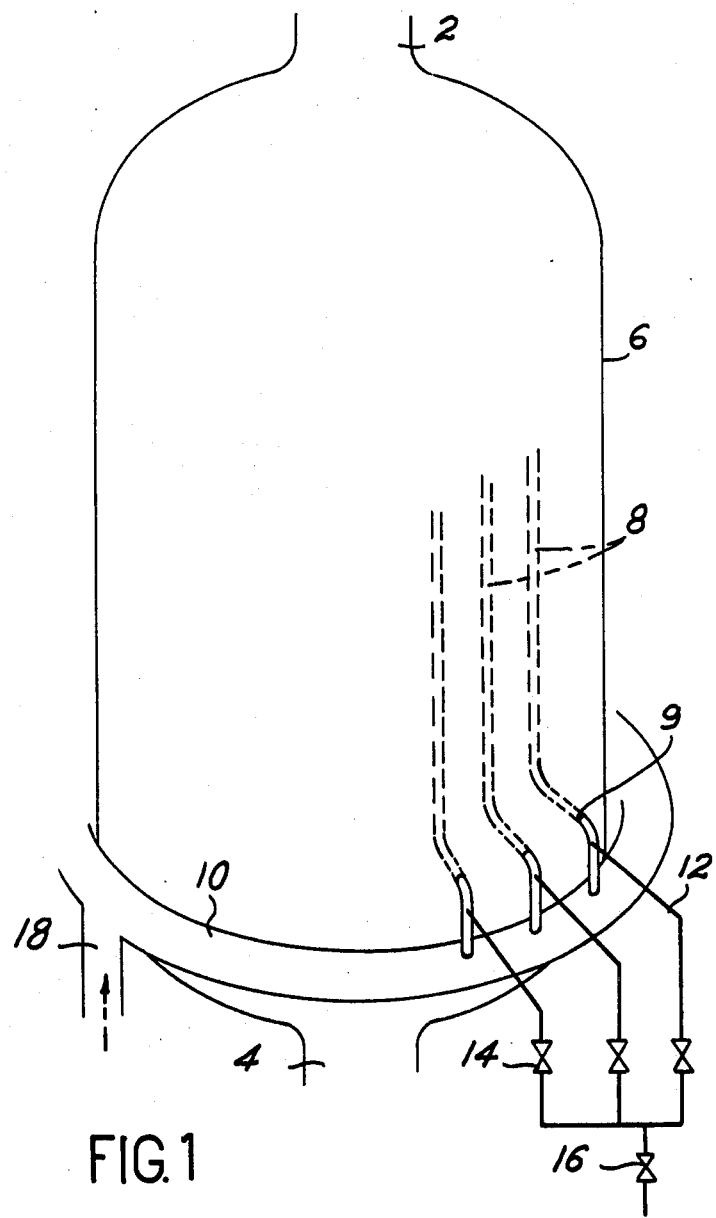
FIG. 1 shows diagrammatically a heat-exchanger of the type comprising circulation tubes separately accessible from the outside.

As previously stated, the method forming the object of the present invention consists in detecting the tube in which a micro-leak has developed with a view to obturating same by means of plugs. The leak concerned is one of minor size, it being understood that larger leaks might be easily detected and located according to other methods (e.g. endoscopy, noise measurement, helium-tightness tests); it must be emphasized, however, that such known methods require a long duration shutdown of the installation as well as important disassemblies of parts of the heat-exchanger, both for carrying out said methods and for making repairs which, usually, are important, on account of the fact that major size leaks are more destructive than the above so-called "micro-leaks".

The present improvement consists in using, as the tracer fluid, either the water of the steam which, in normal operation, flow along the exchanger tubes, and in introducing an inert gas at appropriate pressure into each tube in turn, or into each group of tubes, in the case of a pre-selecting operation.

The locating of the tube to be identified is obtained as soon as, (after having introduced the inert gas into the group of tubes comprising said tube, or into the latter above), one ceases to detect the leak on the sodium side. At that moment, indeed, the leak is no longer fed with water or steam, but is fed with inert gas which cannot be detected according to the diffusing membrane method, which detects hydrogen only, since said gas alone can diffuse through a heated nickel membrane.

More clearly, the method according to the present invention comprises the steps of:

A. detecting the leak during normal operation of the heat-exchanger and assessing the size thereof, in order to determine whether it is a "micro-leak".

B. assuming such is the case, contingently decreasing the exchanger load (viz. the power thereof and the water and steam pressure) down to a level at which:
   a. the leak is always detected
   b. the risk of damaging the tube (in particular, bursting) is reduced, since the pressure within the tube is substantially sub-atmospheric,
   c. the operating steps are made easier and the gas consumption is reduced, since the inert gas is introduced at a lower pressure.

and

C. introducting inert gas into each group of tubes or each separate tube, for a period of time sufficient for, contingently, detecting (on the sodium side) the stoppage of hydrogen.

That period of time is of the same order as the response time in the detection of hydrogen as regards the leak having the worst position in the exchanger, taking account of the speed of sodium within the apparatus, since that speed determines the duration of the information transfer from the leak site to the detector, D. gradually draining the water and steam from the circulation tubes in order to fill the latter with inert gas, after the locating phase, while maintaining a flow or inert gas in the faulty tube or in the group of tubes comprising the faulty tube, which provides complete safety as regards a possible enlargement of the leak up to a dangerous size.

Prior to the above step, or at the same time, the sodium is caused to cool down to a moderate, temperature (e.g. of from 150° to 200°C, viz from 300° F to 390° F). This cooling step is of short duration, since the coolant is water itself, whereas, (as is the case with the method according to the main patent), the cooling step is time-consuming, especially in a large size exchanger, if water and steam are drained as soon as the very beginning of the locating step.

and E, when the sodium temperature reaches the 150°–200°C-range the plugging of the leaking tube, or tubes, is started, which may require draining the sodium according to the operating steps normally provided in an installation of that type.

During the locating step, the heat-exchanger delivers steam loaded with inert gas to a certain extent. Various method permit to compound with the situation. For instance, the impure steam is by-passed to the de-gasser with which the turbine water-station is usually equipped, or said steam is directed to the condenser, through the turbine or by by-passing the latter, and, in that case, the extraction of air in the condenser eliminates the inert gas.

FIG. 1 shows a heat-exchanger with freely accessible circulation tubes, comprising a sodium inlet 2, sodium being expelled at 4 and liquid sodium being contained in tank 6.

The circulation tubes such as 8 have a portion thereof which is accessible from the outside, at 9, and they open into an inlet manifold 10. In normal use, water, steam or a steam-water mixture flow along said tubes.

In portion 9, accessible from the outside, pipes 12 for injecting an inert gas project from the water-tubes, each of said pipes comprising a respective insulating valve such as 14. A group of inert-gas pipes can be provided with a common insulating valve 16, adapted to carry out a quick pre-locating of a whole group of circulation tubes comprising the leaking tube to be identified; the water, or steam, inlet is shown at 18 (the outlet is not shown).

Figure 2:
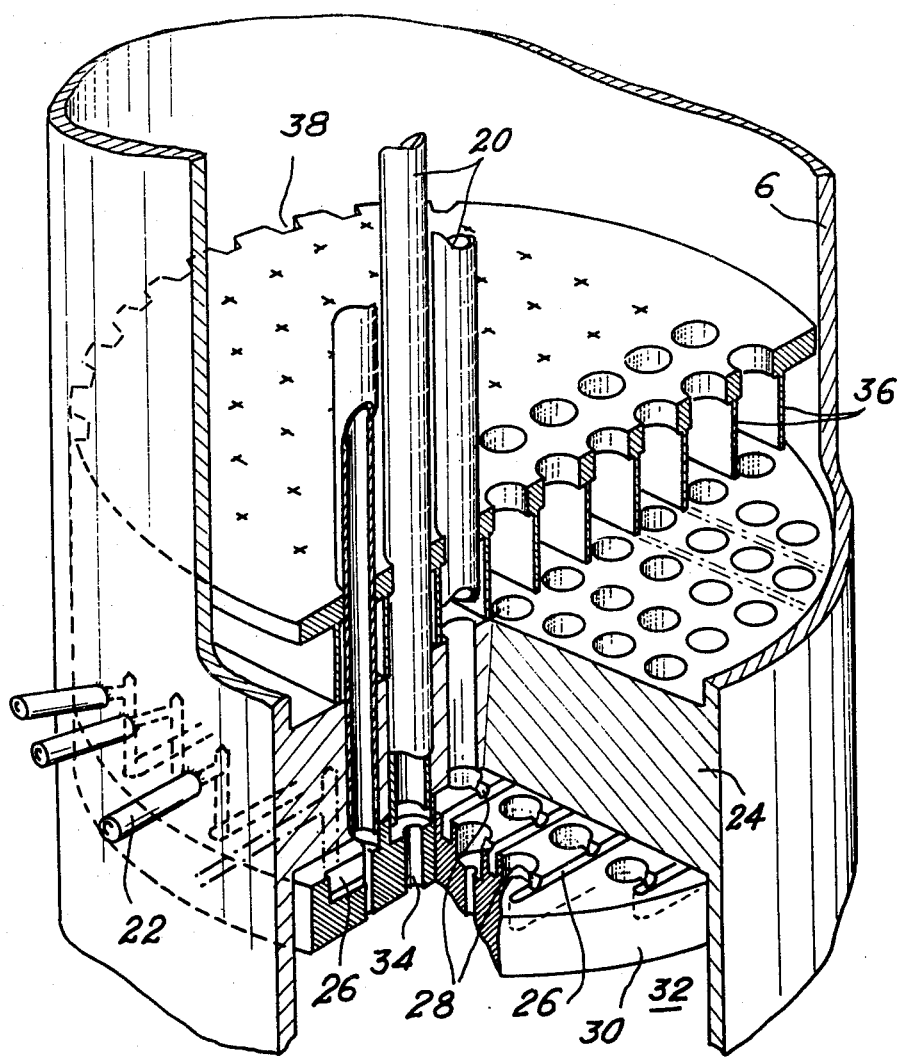
FIG. 2 is a perspective view of a heat-exchanger provided with tubular plates and in which the inert gas is fed through grooves, and of a device for extracting sodium from compartments at right angles to said grooves.

FIG. 2 is a perspective view of a heat-exchanger provided with tubular plate. The exchanger tank 6 is in contact with liquid sodium in which circulation tubes such as 20 are dipped.

These tubes are fed with inert gas, through pipes 22 which cross front tubular plate 24 and open into grooves 26, the tubes of a given row being fed with the inert gas coming from a common groove, via small notches, or cut-outs, 28. The grooves 26 as well as the notches 28 are made in a counter-plate 30 attached to main tubular plate 24; said plate 30 comprises cylindrical recesses, or bores, 34 in register with the water tunes in which water flows from portion 32 (water or steam bore) located under the counter-plate, to circulation tubes such as 20; at 36 are shown the partitions defining the compartments, or cells, through which liquid sodium flows; sodium penetrates into each of said compartments through prismatic openings 36 located on the side of the compartment opposed to pipe 40, so that, once the sodium has penetrated into a given compartment, all the circulation tubes contained therein are exposed to the sodium before the latter is discharged at 40, said sodium contingently carrying therewith a certain amount of hydrogen coming from a possible micro-leak in any one of the compartment tubes.

The diameter of the conduits 34 of the counter-plate has not to be equal to that of the tubular plate, and it is preferably smaller, in order that said conduits act in the manner of a membrane for improving the hydrodynamic stability.

Figure 3:
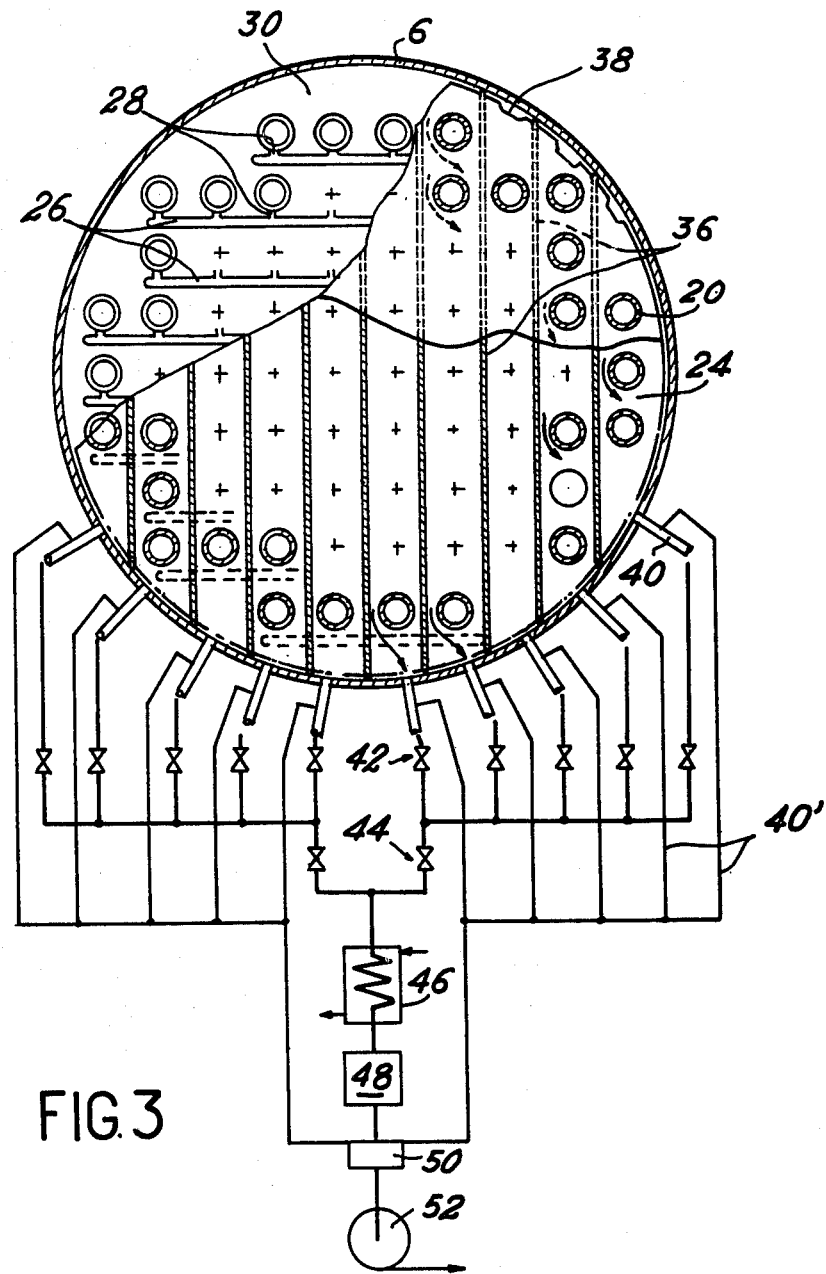
FIG. 3 is a view from above the device for extracting sodium from the compartments, and also shows the general arrangement of the outer sodium circuits, forming generally the sampling and detection device.

FIG. 3 shows the heat-exchanger of FIG. 2 as seen from above; the water-tubes, the partitions between the compartments, or cells, in which liquid sodium flows, and the tubes for extracting sodium from each compartment are designated by reference numerals 20, 36 and 40, respectively.

The tubes 40 are connected to control valves 42, which are, in turn, controlled by valves, such as 44, adapted to control a whole group of sodium extracting tubes; the sodium is heated, or cooled in exchanger 46 before passing through the hydrogen detector 48. The sodium then collects in a mixer 50 and is recycled, by means of an electro-magnetic pump 52, into the main sodium circuit.

Pipes 40 are small diameter by-pass conduits in which sodium coming from each compartment, or cell, continuously flows, with a view to ensuring a permanent drainage thereof, even when valves 42 and 44 are closed for directing the successive samples toward the hydrogen detector.

In normal operation, namely before detecting a micro-leak, valves 42 are permanently open and valves 44 are alternately open and closed, so that the hydogen detector alternately receives a sodium sample which has licked one half of tubes 20 fixed to the tubular plate.

An increase of the amount of hydrogen on one of the samples gives an indication of a leak in the corresponding group of tubes 20.

Figure 4:
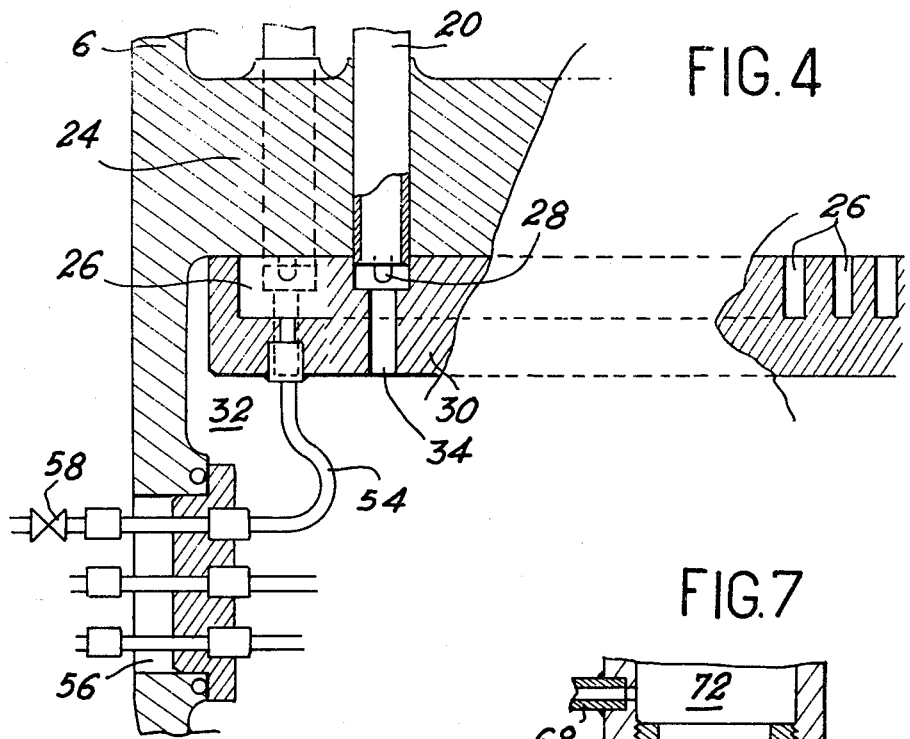
FIG. 4 shows a device for feeding the grooves through the exchanger tank wall.

FIG. 4 shows a modified way of feeding the grooves of the tubular counter-plate. The feed takes place through tank 6, in the portion of the latter where it is in contact with water or steam. Such an arrangement is preferred because it does not weaken the tubular plate which, in the previous embodiment, must necessarily comprise small holes for connecting tubes 22 to grooves 26. According to this new embodiment, each groove is fed by a pipe 54 mounted through an aperture 56. Each one of the pipes 54 which brings inert gas into a feed groove is provided with a control valve 58.

Figure 5:
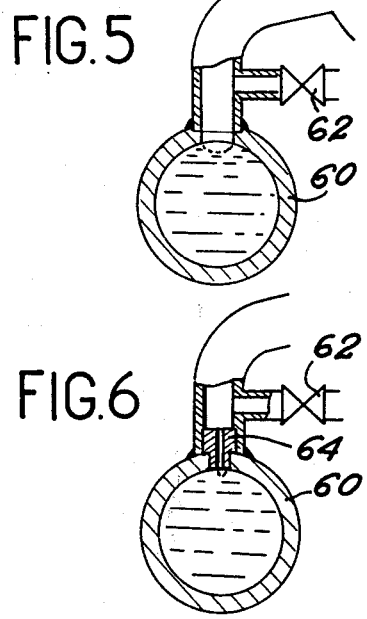
FIG. 5 is a diagrammatic view of a device for separately feeding each circulation tube with inert gas, in the case of an exchanger of the type with circulation tubes separately accessible.

FIG. 5 shows the device for introducing inert gas into the pipe convected to manifold 60, with respect to the exchanger of FIG. 1, viz. an exchanger with circulation tubes which are accessible separately.

The inert gas is introduced, through control valve 62, at such a pressure that counter is repelled into manifold 60 and does not penetrate into the circulation tube.

Figure 6:
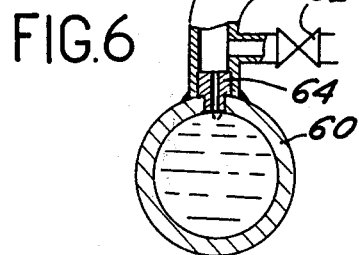
FIG. 6 is a diagram of the device for feeding inert gas, in the case of freely accessible circulation tubes, with a regulating membrane.

In the device of FIG. 6, which follows the same principle of operation, a membrane 64 is added, the normal function of which is to equalize the boiling of water and to improve the hydrodynamic stability of the device. This membrane promotes the pressurizing of the circulation tube during a leak search operation, since it restricts the back-flow of inert gas to the manifold.

Figure 7:
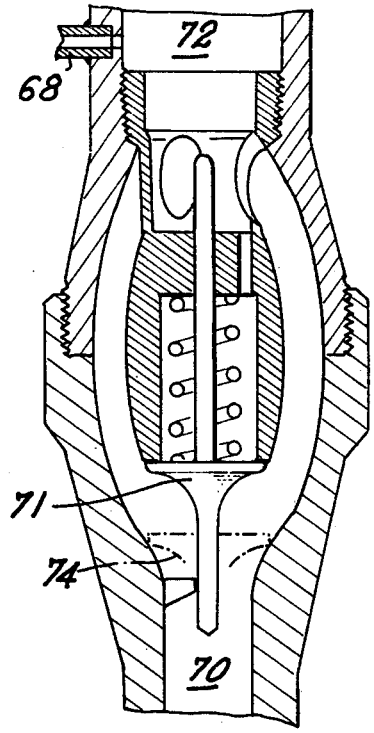
FIG. 7 shows the device for feeding inert gas into the freely accessible circulation tubes, comprising a non-return valve which also acts in the manner of a hydrodynamic adjustment membrane for stabilizing the tube involved.

FIG. 7 shows an improved variant of this device. The stabilizating membrane is automatically adjusted according to the flow-rate and, in a locating operation, acts in the manner of a non-return valve.

In FIG. 7 is provided an inert gas inlet 68 and a water inlet 70; once discharged, water is returned to circulation tube 72. Non-return valve 71 is pressed downwards when the circulation tube is pressurized with inert gas to plug the inlet of the water tube, as shown in dash-and-dot at 74. The device of FIG. 7, like those of FIG. 5 and 6, is valid only in the case of exchangers with separately accessible circulation tubes, viz. those exchangers in which the inert gas car reach each tube downstream of the water inlet.

What we claim is:

1. Improvement to the method for detecting a steam micro-leak in a heat-exchange having circulation tubes surrounded by an alkaline molten metal, said improvement consisting in using the normal operating fluid of the exchanger as the hydrogenated tracer fluid, injecting an inert gas successively into groups of tubes comprising at least one circulation tube, and observing the readings of the leak detecting device based on the measurement of hydrogen until a zero reading, indicative of the leaking tube.

2. A method according to claim 1, wherein the inert gas sent into the group of circulation tubes is selected from the group consisting of the rare gases and nitrogen.

3. A method according to claim 1, wherein, the measurement of hydrogen is carried out in the gas overlying the molten metal.

4. A device for detecting micro-leaks in heat-exchangers, circulation tubes for said exchangers connected to a tubular plate in contact with sodium or with the gas overlying sodium in said exchanger comprising, at the inlets of the circulation tubes, a tubular counter-plate attached to said first tubular plate, having holes arranged according to the same pattern as in said first tubular plate, and provided with grooves, each of said grooves being connected to a supply of pressurized inert gas through a pipe provided with a valve and to a plurality of circulation tubes by cylindrical notches connecting said circulation tubes to said groove.

5. A device according to claim 4, applicable to heat-exchanger with a pattern consisting of a rectangular mesh of circulation tubes wherein each of said grooves is connected to a plurality of aligned tubes by pipes.

6. A device according to claim 5, wherein said grooves are fed with inert gas by pipes opening into the exchanger through said tubular plate.

7. A device according to claim 5, wherein said grooves are fed with inert gas by pipes which open into the exchanger through a tank under said tubular plates, in that portion of the exchanger which contains the operating fluid.

8. A device according to claim 4, wherein the sodium flows in extraction compartments defined by said main tubular plate and by a plate parallel with said plate, said two plates comprising cross-partitions at right angles to said plates and to said inert gas feed grooves, said partitions defining a compartment around a row of circulation tubes, each of the circulation tubes of a compartment being fed with inert gas through a respective groove, and the sodium flowing in a compartment being extracted for measuring the amount of dissolved hydrogen.

* * * * *